US007188361B1

(12) United States Patent
Scheerhorn et al.

(10) Patent No.: US 7,188,361 B1
(45) Date of Patent: Mar. 6, 2007

(54) METHOD OF TRANSMITTING SIGNALS

(75) Inventors: Alfred Scheerhorn, Meppen (DE); Klaus Huber, Darmstadt (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/269,830

(22) PCT Filed: Sep. 17, 1997

(86) PCT No.: PCT/EP97/05081

§ 371 (c)(1),
(2), (4) Date: Apr. 1, 1999

(87) PCT Pub. No.: WO98/15085

PCT Pub. Date: Apr. 9, 1998

(30) Foreign Application Priority Data

Oct. 1, 1996 (DE) ................................. 196 40 526

(51) Int. Cl.
*G06F 21/00* (2006.01)

(52) U.S. Cl. .................. 726/9; 726/5; 726/10; 726/19; 726/20; 726/30; 380/42; 380/262; 380/268; 713/168; 713/170; 713/175

(58) Field of Classification Search ................ 380/268, 380/43, 262, 48, 42; 713/168, 170, 175; 726/5, 9, 10, 19, 20, 30
See application file for complete search history.

(56) References Cited

U.S. PATENT DOCUMENTS 4,193,131 A * 3/1980 Lennon et al. ............... 380/281
4,423,287 A * 12/1983 Zeidler ......................... 705/71

(Continued)

FOREIGN PATENT DOCUMENTS

DE        43 17 380          8/1994

(Continued)

OTHER PUBLICATIONS

Krawczyk: "LSFR-based Hashing and Authentication," Advances in Cryptology-CRYPTO '94, LNCS 839, pp. 129-139, 1994.*

(Continued)

*Primary Examiner*—Emmanuel L. Moise
*Assistant Examiner*—Paul Callahan
(74) *Attorney, Agent, or Firm*—Kenyon & Kenyon LLP

(57) ABSTRACT

A method and/or system for transmitting sequences of signals/data from a transmitter to a receiver and for authenticating the sequences of signals/data may consist of a precalculation phase and of a communication phase in which the signals are transmitted together with the checking sums. In the precalculation phase, a pseudo-random sequence may be first generated by means of a cryptographic algorithm from a time-variable parameter and other initialization data. Non-overlapping sections (z(1) of a sequence (z) having each m bits may be associated to signals (s(i)), wherein i=1, 2, . . . n, of a signal storage. Further non-overlapping m bit sections (t(i)) of the remaining sequence may be selected for coding numbers (1, 2, . . . MAX). The transmitter may transmit the initialization information and the time-variable parameters to the receiver and the receiver may calculate the pseudo-random sequence (z) and checks the receiver authentication token (T). The transmitter may accept the received signals as being authentic when the received authentication tokens match the calculated ones.

20 Claims, 2 Drawing Sheets

U.S. PATENT DOCUMENTS

| | | | |
|---|---|---|---|
| 4,799,258 A | | 1/1989 | Davies |
| 4,919,545 A | | 4/1990 | Yu |
| 5,005,200 A | | 4/1991 | Fischer |
| 5,136,643 A | | 8/1992 | Fischer |
| 5,280,527 A | | 1/1994 | Gullman et al. |
| 5,297,208 A | * | 3/1994 | Schlafly et al. ............... 380/49 |
| 5,299,263 A | | 3/1994 | Beller et al. |
| 5,319,710 A | * | 6/1994 | Atalla et al. .................. 380/23 |
| 5,485,519 A | | 1/1996 | Weiss |
| 5,491,750 A | * | 2/1996 | Bellare et al. .............. 713/155 |
| 5,664,016 A | * | 9/1997 | Preneel et al. ................. 380/28 |
| 5,673,319 A | * | 9/1997 | Bellare et al. ................. 380/25 |

FOREIGN PATENT DOCUMENTS

| | | |
|---|---|---|
| DE | 44 06 601 | 9/1995 |
| WO | WO 94/21066 | 9/1994 |
| WO | WO 98/15085 | 4/1998 |

OTHER PUBLICATIONS

Menezes, A., Van Oorschot, P., Vanstone, S.: Handbook of Applied Cryptography, Pub. 1996 CRC Press., pp. 173, 174, 18 250, and 738.*

Jueneman et al., "Message Authentication with Manipulation Detection Codes," Proceedings of the 1983 Symposium on Security and Privacy, Apr. 25, 1983, pp. 33-54.

* cited by examiner

METHOD OF TRANSMITTING SIGNALS

FIELD OF THE INVENTION

The present invention relates to a method of transmitting signals between a transmitter and a receiver using keys and cryptographic algorithms.

RELATED TECHNOLOGY

In transmission of signal sequences, authentic transmission of the data or signals plays a major role. For example, one method of achieving this goal is described in ISO/IEC 9797, Information Technology—Security techniques—Data integrity mechanisms using a cryptographic check function employing a block cipher algorithm (JTC1/SC27 1994). Identical secret keys in combination with an encoding algorithm (block cipher, encipherment algorithm) or with a key-dependent single-way function (cryptographic check function) are assigned to the transmitter and the receiver. This can take place, for example, on a card. The transmitter adds a cryptographic check sum (message authentication code) to each signal (datum) depending on the secret key and the cryptographic algorithm (encoding or single-way function). The receiver in turn calculates the check sum and acknowledges the received signals as authentic if the check sum is identical. However, this method has the following disadvantages: to detect a change in sequence of transmitted data, the check sum of a signal is calculated as a function of the check sum of the signals transmitted previously. Even in the case when a check sum is transmitted after each signal, this is still necessary because otherwise a hacker could record pairs of signal check sums and enter them in an altered sequence without being detected. With the available method, this requires the cryptographic algorithm to be executed for each check sum. Since the sequence and selection of signals are not precisely fixed in advance, it can be impossible to calculate the required check sums in advance.

This can lead to problems in a time-critical environment. The cryptographic algorithm can be calculated on a chip card, for example. This may be advantageous when using a chip card that has already been evaluated, because otherwise an additional software implementation of the algorithm must be evaluated again. Communication with the chip card and calculation of the cryptographic algorithm on the card can be very time intensive.

SUMMARY

Example embodiments and/or example methods of the present invention are directed to creating a method of authentic signal and data transmission that will permit calculation of authentication information with a given signal supply and a given maximum number of signals to be transmitted, so that check sums for the signals and/or data transmitted can be calculated quickly and easily from this previously calculated information in the transmission phase.

Example embodiments and/or example methods of the present invention are directed to providing a method for transmitting signals between a transmitter and a receiver, the method including calculating data as a function of a secret key using at least one cryptographic algorithm in a calculation phase, and calculating authentication tokens for the signals as a function of the data, in a communication phase, so as to authenticate both the signals and a transmission sequence of the signals.

By intentionally introducing a preliminary calculation phase and a communication phase into the transmission process, one may now perform the calculation of authentication information before the actual transmission phase, and then during the transmission phase, check sums for the signals transmitted can be calculated easily and quickly from this information already calculated. This may be achieved by a method composed of a preliminary calculation phase and a communication phase in which the signals or data are transmitted together with the check sums. In the preliminary calculation phase, first a pseudo-random sequence Z is generated by cryptographic algorithms, e.g., a block cipher in the output feedback mode, from the time-variant parameter (sequence number, time mark and other initialization data). As an example, m=16, 32 or 64 is assumed for a security parameter m. Then nonintersecting strings z(i) of m bits each from the sequence Z are assigned to the signals s[i], i=1, 2, . . . , n of the signal supply. Additional nonintersecting m-bit strings t[i] are selected from the remaining sequence as the coding of the numbers 1, 2, . . . MAX, where MAX is the maximum number of signals to be transmitted.

If transmitter authentication is necessary in the subsequent communication phase, then first the sequence of one pass authentication may be performed according to the reference(s) ISO/IEC 9798-2, Information technology—Security techniques—Entity authentication mechanisms—Part 2: Mechanisms using symmetric encipherment algorithms, (JTC1/SC27 1994) and ISO/IEC 9798-4, Information technology—Security techniques—Entity authentication mechanisms—Part 4: Mechanisms using a cryptographic check function (JTC1/SC27 1995). The transmitter may transmit the initialization information and the time-variant parameters to the receiver, and it may transmit a number of previously unused bits from Z to the receiver as an authentication token. The receiver in turn may calculate pseudo-random sequence Z and check the received authentication token. The signals received by the receiver during the signal transmission are accepted as authentic if the received authentication token matches the token calculated. In addition, modifications of the method are also possible, as described herein.

DETAILED DESCRIPTION

Figure 1:
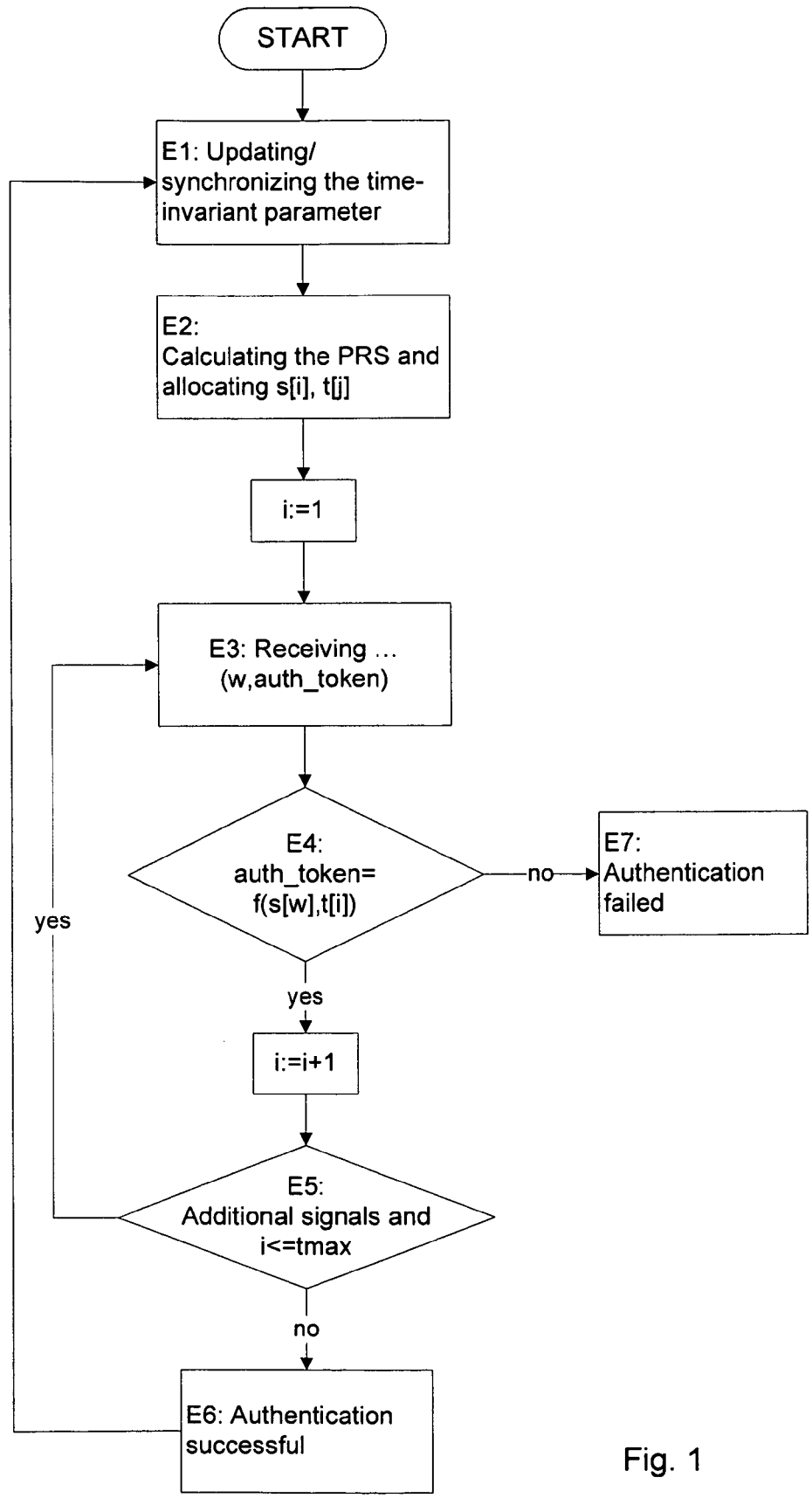
FIG. 1 is a flow chart illustrating the schematic operation sequence in the receiver.

An example embodiment and/or example method of the present invention may include a preliminary calculation phase and a communication phase in which the signals are transmitted together with the check sums.

Preparatory Phase:

Using the cryptographic algorithm (for example, a block cipher in the output feedback mode according to ISO/IEC 10116, Information Processing—Modes of operation for an n-bit block cipher algorithm (JTC1/SC27 1991)), first a pseudo-random sequence Z is generated from a time-variant parameter (sequence number, time mark, according to ISO/IEC 9798-2, Information technology—Security techniques—Entity authentication mechanisms—Part 2: Mechanisms using symmetric encipherment algorithms (JTC1/SC27 1994)) and other initialization data. Let m be a security parameter, such as M=16, 32 or 64. Then from the sequence Z, nonintersecting strings z[i] with m bits each are assigned to signals s(i), i=1, 2, ..., n of the signal supply. Additional nonintersecting n-bit strings t[i] are selected from the remaining sequence as the coding of numbers 1, 2, ... MAX, where MAX is the maximum number of signals to be transmitted.

Communication Phase:

a) Transmitter Authentication:

If transmitter authentication is necessary, first the sequence of one pass authentication is followed according to the reference ISO/IEC 9798-2, Information technology—Security techniques—Entity authentication mechanisms—Part 2: Mechanisms using symmetric encipherment algorithms (JTC1/SC27 1994), and ISO/IEC 9798-4 Information technology—Security techniques—Entity authentication mechanisms—Part 4: Mechanisms using a cryptographic check function (JTC1/SC27 1995). The transmitter transmits the initialization information and the time-variant parameters to the receiver. It transmits as the authentication token a number of previously unused bits from Z to the receiver. The receiver in turn may calculate pseudo-random sequence Z and checks the received authentication token.

b) Signal Transmission and Authentication:

Let $s[k[1]]$ be the first signal transmitted; then the transmitter transmits $T(1):=f(z[k[1]], t[1])$, where f is a link between the two values $z[k[1]]$ and $t[1]$ that can be calculated rapidly for authentication of the first signal. One example of f is the bit-by-bit XOR link.

For i=2, 3, ..., i maximally MAX, let $s[k[i]]$ be the i-th signal transmitted. For authentication of this signal, the transmitter may transmit token $T(i):=f(z[k[i]], t[i])$. The receiver may perform the same calculations and accepts the received signals as authentic if the authentication token received by the transmitter matches the token calculated.

The sequence of transmitted signals may be guaranteed by the influence of the values t[i].

One variant of signal authentication proceeds as follows: If it is necessary to select authentication token T(i) of the i-th signal $s[k[i-1]]$ as a function of all previously transmitted signals $s[k[1]], \ldots, s[k[i-1]]$, then the token $T(i)=f(t[i], F(i))$ can be transmitted for authentication of the i-th signal $s[k[i]]$, where $F(1)=s[k[1]]$ and $F(i)=f(s[k[i]], F(i-1))$ for i>1.

Calculation of authentication token T(i) thus requires calculation of f twice.

One example of using such a method is the authentic establishment of a connection in making a telephone call. When transmitting the dial tones, it may not be known whether an additional dial tone will follow. Therefore, it seems necessary to authenticate each dial tone by transmitting a token in the pause following it. With multi-frequency dialing methods, the length of the dial tones is at least 65 ms, and the length of the pause between dial tones is at least 80 ms. For the authentication described here, this short interval of 145 ms for authentication is sufficient with relatively no problems.

The sequence of operations or steps by the receiver are described on the basis of a flow chart according to FIG. 1.

In the telephone example, the transmitter is the telephone, optionally equipped with a cryptographic module and/or chip card, and the receiver is the telephone network, such as the closest exchange.

E1 and S1: The time-invariant parameter here is synchronized between the receiver and transmitter. The time-invariant parameter may be a sequence number or a time mark which has been synchronized. This parameter may optionally also be transmitted as plain text or in encoded form from the transmitter to the receiver for synchronization. In the method according to the present invention, it is expedient that the transmitter already knows the time-invariant parameter before a connection is attempted in order to calculate s[ ], t[ ] in advance.

E2 and S2: The transmitter and receiver here first calculate a random sequence PRS (pseudo-random sequence) of length m* (smax+tmax) bits, where m: security parameter, namely in this example m:=32.

smax: Maximum number of different signals (number of elements of the alphabets/signal supply). In the telephone example, this refers to digits 1 through 9 and special symbols such as # and others.

tmax: Maximum number of signals to be authenticated in one pass. In the telephone example this may be the maximum length of a telephone number, the maximum number of digits and special symbols for establishing a connection.

Then nonintersecting strings of m bits of this random sequence PRS may be assigned to m-bit quantities s[1], s[2], ..., s[smax], t[1], t[2], ..., t[tmax], etc.

s[1]=bit 1 through bit m of the PRS s[2]=bit m+1 through bit 2*m of the PRS

Figure 2:
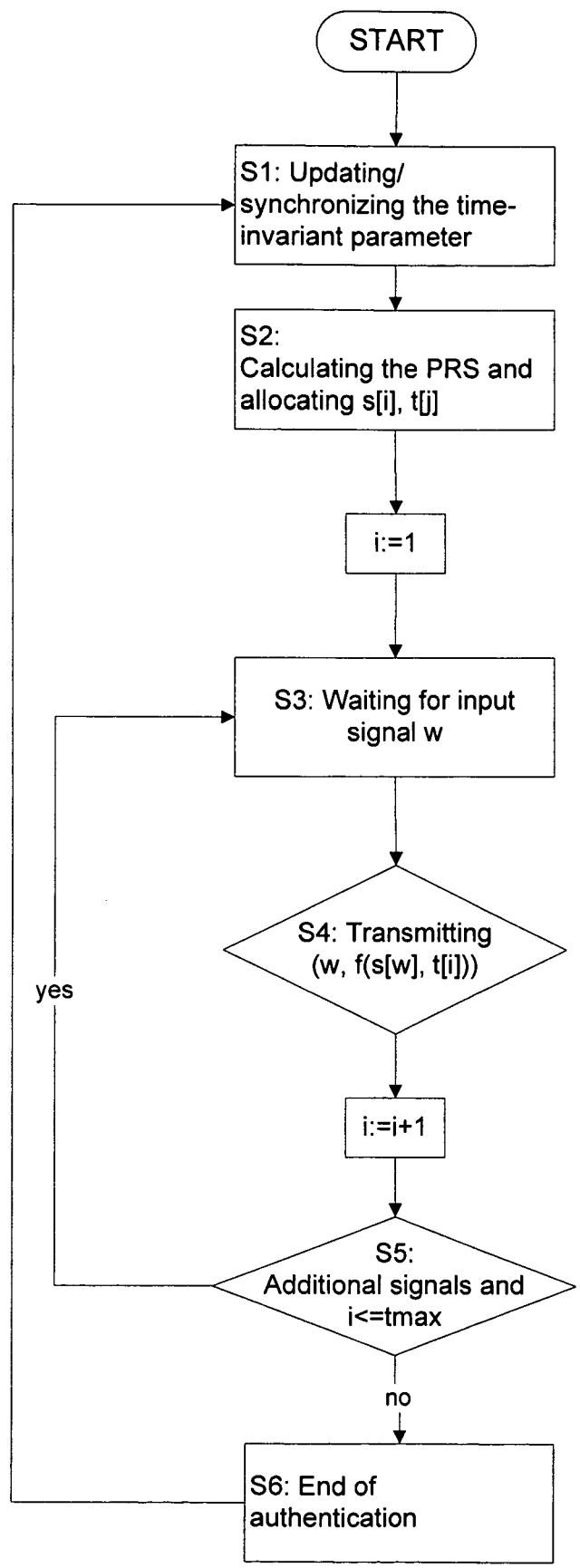
FIG. 2 is a flow chart illustrating the schematic operation sequence in a transmitter.

...

s[max]=bit (smax−1)*m+1 through bit smax*m of random sequence PRS t[1]=bit smax*m+1 through bit (smax+1)*m of random sequence PRS t[tmax]=bit (smax+tmax−1)*m+1 through bit (smax+tmax)*m of random sequence PRS An example sequence of operations or steps for the transmitter is described below on the basis of FIG. 2.

S3: The transmitter waits for signal w which is to be transmitted authentically; w is interpreted as a natural number between 1, 2, ..., smax in order to keep the mapping w→s[w] simple.

S4: The transmitter sends the I-th signal w together with authentication token f(s[w], t[i]). In the telephone example, the token is $f(s[w], t[i])=s[w] \oplus t[i]$, the bit-by-bit XOR of s[w] and t[i].

S5: S3 and S4 may be iterated either until no more signals are to be transmitted authentically or until the maximum number of signals that can be authenticated with this supply of previously calculated random sequence PRS has been reached.

S6: In the telephone example, the transmitter is now waiting for a connection to be established with the receiver.

E3, E4 and E5: As long as new signals with the respective authentication tokens are received, the receiver checks on whether the authentication tokens calculated E6: If all the tokens match, the received signals are accepted as authentic. In the telephone example, the connection is now established.

E7: If authentication is unsuccessful, no connection is established.

The invention claimed is:

1. A method for transmitting signals between a transmitter and a receiver, the method comprising:

calculating data as a function of a secret key using at least one cryptographic algorithm in a calculation phase; and calculating authentication tokens for the signals as a function of the data in a subsequent communication phase so as to authenticate both the signals and a transmission sequence of the signals;

wherein the signals received by the receiver from the transmitter are accepted as authentic if a transmitted authentication token that is received by the receiver matches the authentication token calculated by the receiver, the authentication token calculated by the receiver being completed before actual transmission of the signals.

2. The method as recited in claim 1 wherein the calculation phase includes generating a pseudo-random sequence.

3. The method as recited in claim 2 wherein certain strings of the pseudo-random sequence are used for coding the signals and positions in the transmission sequence, and wherein the authentication token of one of the signals transmitted at an i-th position is calculated as a function of the coding of the signal and the coding of the respective position in the transmission sequence.

4. The method as recited in claim 3 wherein the authentication token of the one signal transmitted at the i-th position is a bit-by-bit XOR link or an equivalent logic function of the coding of the one signal and the coding of the respective position in the transmission sequence.

5. The method as recited in claim 1 wherein the calculation phase includes generating a pseudo-random sequence.

6. The method as recited in claim 5 wherein certain strings of the pseudo-random sequence are used for coding the signals and positions in the transmission sequence, and wherein the authentication token of a one of the signals transmitted at an i-th position is calculated as a function of the coding of all previously transmitted signals and the coding of the respective position in the transmission sequence.

7. The method as recited in claim 6 wherein the authentication token of the one signal transmitted at the i-th position is a bit-by-bit XOR link or an equivalent logic link of the coding of all the previously transmitted signals and the coding of the respective position in the transmission sequence.

8. The method as recited in claim 1 wherein the at least one cryptographic algorithm includes a block cipher.

9. The method as recited in claim 8 wherein the block cipher is based on Data Encryption Standard (DES).

10. The method as recited in claim 2 wherein the at least one cryptographic algorithm includes a block cipher, the pseudo-random sequence being generated by operating the block cipher in a known output feedback mode.

11. The method as recited in claim 5 wherein the at least one cryptographic algorithm includes a block cipher, the pseudo-random sequence being generated by operating the block cipher in a known output feedback mode.

12. The method as recited in claim 1 wherein the communication phase further includes calculating another token for authentication of the transmitter, the other token being subsequently transmitted so as to initialize the receiver for authentication of the transmitter.

13. The method as recited in claim 1 further comprising confirming the transmission sequences by nonintersecting m-bit strings.

14. A method for transmitting signals between a transmitter and a receiver, the method comprising:

calculating data as a function of a secret key using at least one cryptographic algorithm in a calculation phase, the calculation phase including generating a pseudo-random sequence, certain strings of the pseudo-random sequence being used for coding the signals and positions in the transmission sequence, and wherein the authentication token of one of the signals transmitted at an i-th position is calculated as a function of the coding of the signal and the coding of the respective position in the transmission sequence; and calculating authentication tokens for the signals as a function of the data in a subsequent communication phase so as to authenticate both the signals and a transmission sequence of the signals, the authentication token of the one signal transmitted at the i-th position being a bit-by-bit XOR link or an equivalent logic function of the coding of the one signal and the coding of the respective position in the transmission sequence;

wherein the signals received by the receiver from the transmitter are accepted as authentic if a transmitted authentication token that is received by the receiver matches the authentication token calculated by the receiver, the authentication token calculated by the receiver being completed before actual transmission of the signals.

15. The method as recited in claim 14 wherein certain strings of the pseudo-random sequence are used for coding the signals and positions in the transmission sequence, and wherein the authentication token of a one of the signals transmitted at an i-th position is calculated as a function of the coding of all previously transmitted signals and the coding of the respective position in the transmission sequence.

16. The method as recited in claim 15 wherein the authentication token of the one signal transmitted at the i-th position is a bit-by-bit XOR link or an equivalent logic link of the coding of all the previously transmitted signals and the coding of the respective position in the transmission sequence.

17. The method as recited in claim 14 wherein the at least one cryptographic algorithm includes a block cipher, the block cipher being based on Data Encryption Standard (DES).

18. The method as recited in claim 14 wherein the at least one cryptographic algorithm includes a block cipher, the pseudo-random sequence being generated by operating the block cipher in a known output feedback mode.

19. The method as recited in claim 14 wherein the communication phase further includes calculating another token for authentication of the transmitter, the other token being subsequently transmitted so as to initialize the receiver for authentication of the transmitter.

20. A method for transmitting signals between a transmitter and a receiver, the method comprising:

calculating data as a function of a secret key using at least one cryptographic algorithm in a calculation phase, the calculation phase including generating a pseudo-random sequence, certain strings of the pseudo-random sequence being used for coding the signals and positions in the transmission sequence, and wherein the authentication token of one of the signals transmitted at an i-th position is calculated as a function of the coding of the signal and the coding of the respective position in the transmission sequence; and calculating authentication tokens for the signals as a function of the data in a subsequent communication phase so as to authenticate both the signals and a transmission sequence of the signals, the authentication token of the one signal transmitted at the i-th position being a bit-by-bit XOR link or an equivalent logic function of the coding of the one signal and the coding of the respective position in the transmission sequence; and confirming the transmission sequences by nonintersecting m-bit strings;

wherein the signals received by the receiver from the transmitter are accepted as authentic if a transmitted authentication token that is received by the receiver matches the authentication token calculated by the receiver, the authentication token calculated by the receiver being completed before actual transmission of the signals.

* * * * *